United States Patent [19]
Kakimoto

[11] Patent Number: 4,908,840
[45] Date of Patent: Mar. 13, 1990

[54] PSK MODULATION WITH AN ERROR CORRECTION MEMORY

[75] Inventor: Kazuo Kakimoto, Tokyo, Japan

[73] Assignee: NEC Corporation, Tokyo, Japan

[21] Appl. No.: 273,538

[22] Filed: Nov. 21, 1988

[30] Foreign Application Priority Data

Nov. 20, 1987 [JP] Japan .................... 62-291708

[51] Int. Cl.$^4$ .............................................. H03C 3/08
[52] U.S. Cl. ...................................... 375/60; 375/67; 332/161
[58] Field of Search ................ 375/67, 39, 60, 52, 375/59, 61; 370/120–122, 71; 455/113, 42, 60; 332/16 R, 19, 23 R, 21, 161

[56] References Cited

U.S. PATENT DOCUMENTS 4,321,706  3/1982  Craft ................................... 375/59
4,696,017  9/1987  Masheff et al. ................. 332/23 R Primary Examiner—Robert L. Griffin
Assistant Examiner—Marianne Huseman
Attorney, Agent, or Firm—Sughrue, Mion, Zinn, Macpeak & Seas

[57] ABSTRACT

In a modulation circuit, a variable frequency carrier is modulated by a binary PSK (phase shift keying) modulator with the digital signal of a selected data channel. A plurality of error correction values are stored in storage locations of a memory corresponding to the channels, each of the error correction values being representative of a deviation of the inherent operating characteristic of the modulator when operating at a particular frequency of the carrier from a predetermined operating characteristic. The carrier is generated by a channel synthesizer and its frequency is varied corresponding to the selected channel. The memory is addressed to read an error correction value from one of the storage locations corresponding to the selected channel. An error correction circuit is provided to correct the deviation in response to the error correction value read out of the memory.

12 Claims, 4 Drawing Sheets

PSK MODULATION WITH AN ERROR CORRECTION MEMORY

RELATED APPLICATION

This application is related to copending U.S. patent application Ser. No. 07/226,012, filed July 29, 1988, and assigned to the same assignee as the present invention.

BACKGROUND OF THE INVENTION

The present invention relates to a PSK (phase shift keying) modulation circuit for digital communications systems.

In digital communications systems, particularly for satellite networks, precision PSK modulators are employed for interfacing data terminals and transmission media. Because of the inherent nonlinear characteristics of the diodes and transistors that comprise a PSK modulator of this type, their frequency response characteristics vary from one device to another. To ensure high precision PSK modulation performance, manual adjustments have been required to correct modulation phase errors and modulation amplitude errors whenever the carrier frequency is changed to transmit the data of a selected channel.

In a conventional satellite communications system such as Intelsat Business Service where a maximum of 3,200 data channels are available on a 140-MHz intermediate frequency band, a high precision local oscillator is used to supply the PSK modulator with a constant frequency carrier to be modulated with the baseband digital signal of a selected channel and the output of the modulator is converted in frequency by a mixer supplied with a variable frequency carrier from a channel synthesizer. Although this current PSK modulation technique can eliminate frequent adjustments and proved satisfactory for performance, the frequency conversion process introduces unwanted signals and requires an extra circuit for eliminating such unwanted signals. In addition, the use of a local oscillator adds to the complexity and the total cost of the system.

SUMMARY OF THE INVENTION

It is therefore an object of the present invention to provide a low cost, high precision PSK modulation circuit which can be used for a wideband digital communications system in which the carrier frequency is varied for modulating a selected data channel.

In a broader aspect, the modulation circuit of the present invention comprises a binary PSK (phase shift keying) modulator for modulating a variable frequency carrier with a digital signal of a selected one of a plurality of channels. A plurality of error correction values are stored in storage locations of a memory corresponding to the channels, each of the error correction values being representative of a deviation of the inherent operating characteristics of the modulator when operating at a particular frequency of the carrier from a predetermined operating characteristic. The carrier is generated by a channel synthesizer and its frequency is varied corresponding to the selected channel. The memory is addressed to read an error correction value from a storage location corresponding to the selected channel onto an error correction circuit to correct the deviation of the modulator.

In a specific aspect of the present invention, a quadrature PSK modulation circuit is provided which comprises a first binary PSK modulator for modulating a first variable frequency carrier with the digital signal of a first selected channel and a second binary PSK modulator for modulating a second variable frequency carrier with the digital signal of a second selected channel. The second variable frequency carrier has the same frequency as the first carrier and is phase shifted with respect thereto by 90 degrees. The memory stores a plurality of sets of first, second and third error correction values in storage locations corresponding to the data channels, the first and second error correction values being representative of deviations of the inherent operating characteristics of the first and second PSK modulators when operating at a particular frequency of the carriers from predetermined operating characteristics, and the third error correction value being representative of a phase deviation of one of the modulators at the particular frequency from a predetermined phase. A set of the first, second and third error correction values is read from one of the storage locations corresponding to the selected channels. The first and second error correction values read from the memory are applied to first and error correcting circuits for correcting the operating characteristics of the first and second PSK modulators. The third correction value from the memory is supplied to a variable phase shifter to shift the phase of one of the first and second variable frequency carriers to correct the phase deviation.

BRIEF DESCRIPTION OF THE DRAWINGS

The present invention will be described in further detail with reference to the accompanying drawings, in which.

DETAILED DESCRIPTION

Figure 1:
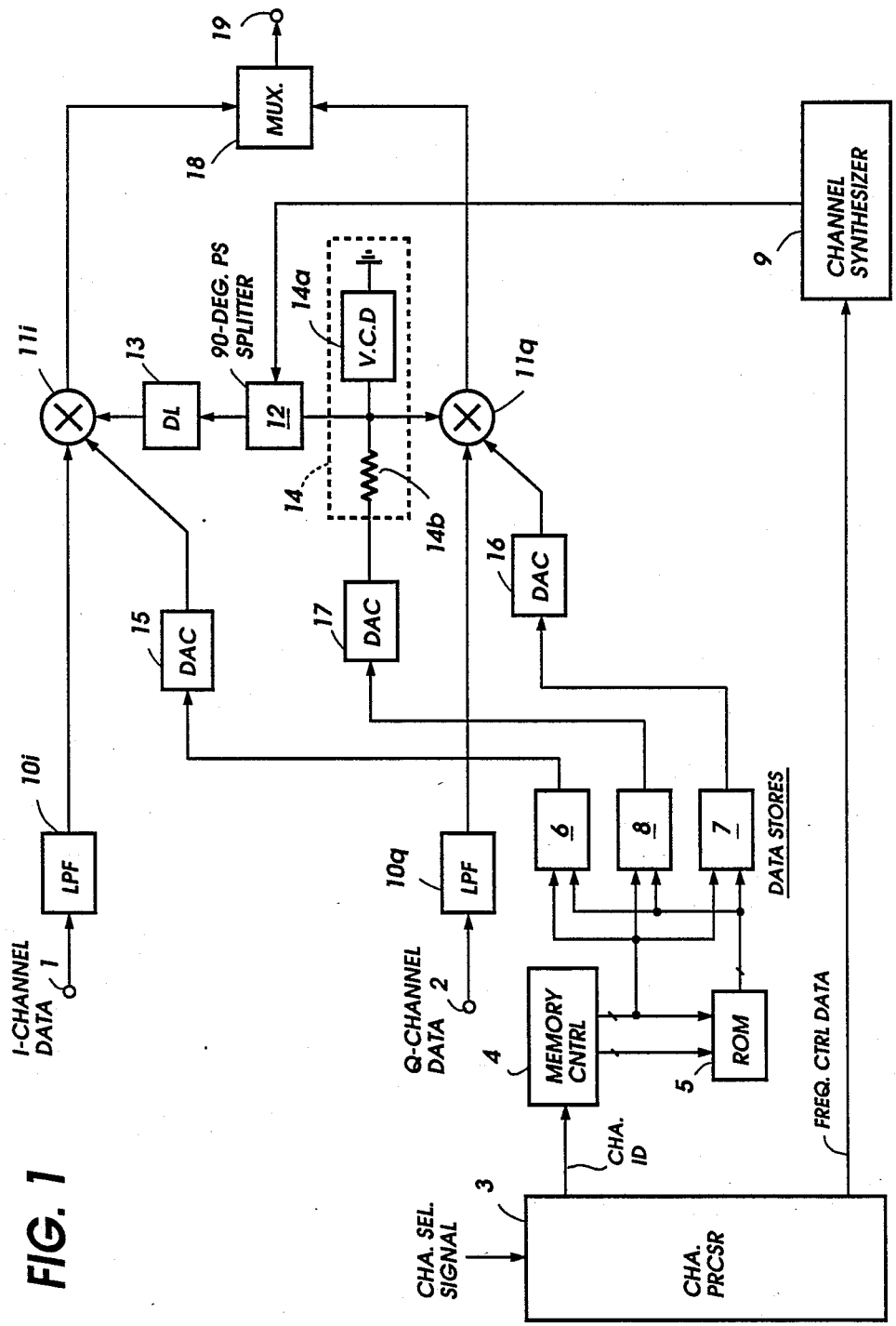
FIG. 1 is a block diagram of a quadrature PSK modulation circuit according to an embodiment of the present invention.

Referring to FIG. 1, there is shown a quadrature PSK (phase shift keying) modulation system according to a preferred embodiment of the present invention. The QPSK modulation system receives a pair of I- and Q-channel baseband digital signals at input terminals 1 and 2, respectively, from a program source, not shown, of a system such as Intelsat Business Service, which provides 3,200 data channels with a 140-MHz intermediate frequency or 1,600 data channels with a 70-MHz intermediate frequency. The received I- and Q-channel signals are supplied through respective waveshaping lowpass filters 10i and 10q and fed to I- and Q-channel binary PSK modulators, or mixers 11i and 11q. The modulation system includes a channel processor 3 which receives a channel selection signal from the program source and generates channel identifiers that identify the received I- and Q-channel digital signals at the input terminals 1 and 2 and a frequency control signal. The channel identifiers are supplied to a memory controller 4 and the frequency control signal is applied to a channel synthesizer 9 which generates a carrier at a frequency corresponding to the selected channels. This carrier is supplied to a 90-degree phase shift splitter 12 where the carrier is split into two components, one being phase shifted by 90 degrees by the splitter 12 and applied to a junction between a variable capacitance diode 14a and a resistor 14b which are series connected to form a variable phase shifter 14 to introduce a variable amount of phase shift with respect to a prescribed center value in accordance with a phase control signal applied to one end of the resistor 14b. The other carrier component is not delayed by the splitter 12 and applied to a delay line 13 having a constant delay time equal to the center value of the variable phase shifter 14. The carrier outputs of delay line 13 and variable phase shifter 14 are in quadrature phase relationship to each other and applied to the mixers 11i and 11q, respectively, to be modulated with the I- and Q-channel signals.

Memory controller 4 decodes the input channel identifiers and supplies n-bit channel data to a read-only memory (ROM) 5 and chip-select data to correction data stores 6, 7 and 8 as well as the memory 5. Each of the mixers 11i and 11q has an inherent operating characteristic with respect to the carrier frequency of each data channel because of their particular physical characteristics, which might cause deviations from consistent operating conditions. To secure a consistent PSK modulation performance over difficult carrier frequencies, the ROM 5 stores numeric modulation error correction data for each of the mixers 11i and 11q in cell locations which are addressable as a function of a carrier frequency represented by the n-bit channel data and chip-select data. Error correction data are read out of the ROM 5 in this way in response to the channel data and supplied respectively to correction data stores 6, 7 and 8. The stored data are converted to analog form by digital-to-analog converters 15, 16 and 17 and supplied to the control terminals of mixers 11i and 11q and to the variable phase shifter 14. In accordance with error correction data from D/A converters 15 and 16, the frequency-dependent phase modulation errors of mixers 11i and 11q are corrected and in accordance with the phase control signal from D/A converter 17, the frequency-dependent phase error of these mixers is corrected by the variable phase shifter 14. In this way, the PSK modulation characteristics of mixers 11i and 11q can be precisely corrected for each pair of I and Q channels. The outputs of mixers 11i and 11q are combined by a multiplexer 18 for coupling to an output terminal 19.

Figure 2A:
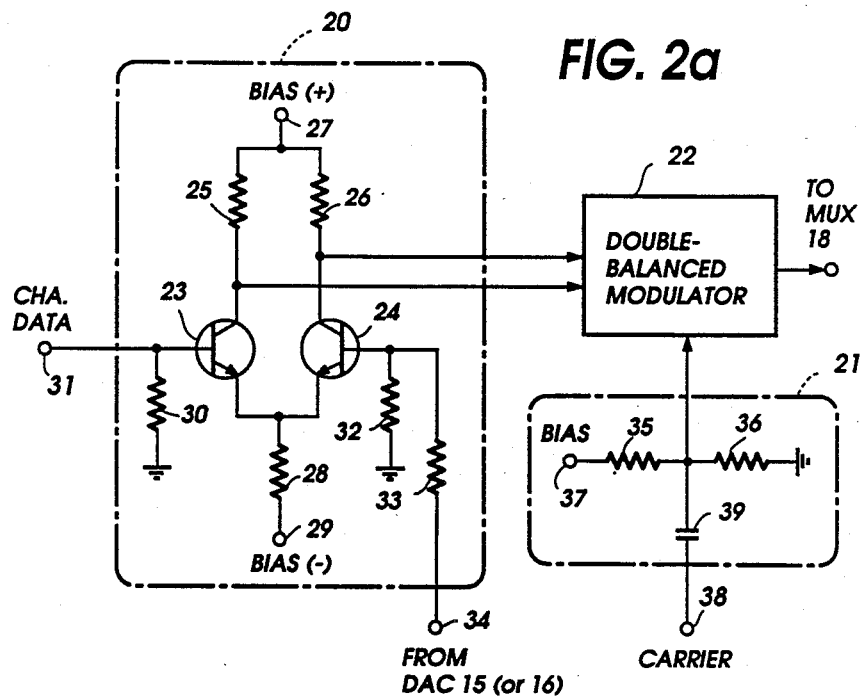
FIGS. 2a and 2b are circuit diagrams of each of the mixers of FIG. 1.
Figure 2B:
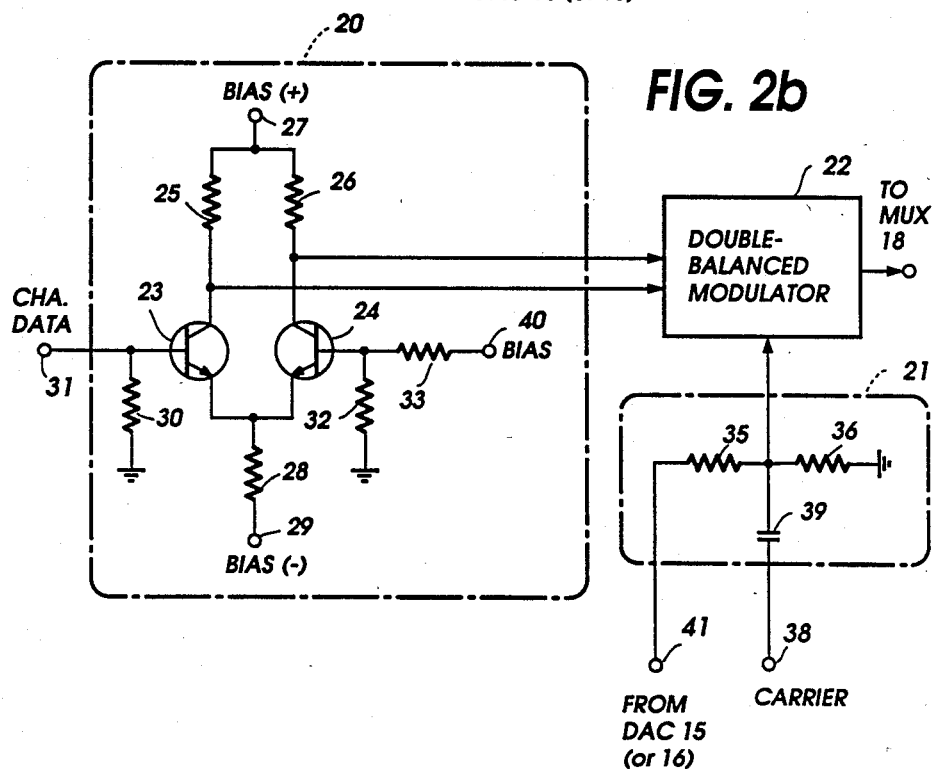

Details of each of the mixers 11i and 11q of FIG. 1 are illustrated in FIGS. 2a and 2b. In FIG. 2a, each mixer comprises a first voltage mixing circuit 20, or a differential circuit, a second voltage mixing circuit 21 and a double-balanced modulator 22 of the type as described in Sygnetic's Application Manual, pages 186–189. The first voltage mixing circuit 20 is formed by a pair of transistors 23 and 24 with their collectors being respectively coupled by resistors 25, 26 to a positive bias voltage source 27 and with their emitters being coupled together to one end of a resistor 28, the other end of which is connected to a negative bias source 29. The base of transistor 23, which is grounded by resistor 30, is connected to a terminal 31 to which the associated channel data is applied. The base of transistor 24, which is also grounded by resistor 32, is connected by a resistor 33 to a terminal 34 to which the analog error correction voltage from the associated D/A converter 15 or 16 is applied. The voltages developed across the collectors of transistors 23 and 24 represent the sum of voltages applied to the terminals 31 and 34 and are supplied to the positive and negative signal input ports of the double-balanced modulator 22. The second voltage mixing circuit 21 comprises resistors 35 and 36 connected in series between ground and a bias voltage source 37. The associated carrier input is applied through a terminal 38 and a capacitor 39 to a junction between resistors 35 and 36 and summed with the bias voltage from source 37, the summed voltage at the junction being applied to a carrier input port of the double-balanced modulator 22.

In FIG. 2b, the error correction voltage from the associated D/A converter 15 or 16 may be connected through terminal 41 to resistor 35 of the voltage mixing circuit 22 and summed with the carrier input from terminal 38, while the base of transistor 24 is coupled by resistor 33 to a bias voltage source 40.

Figure 3:
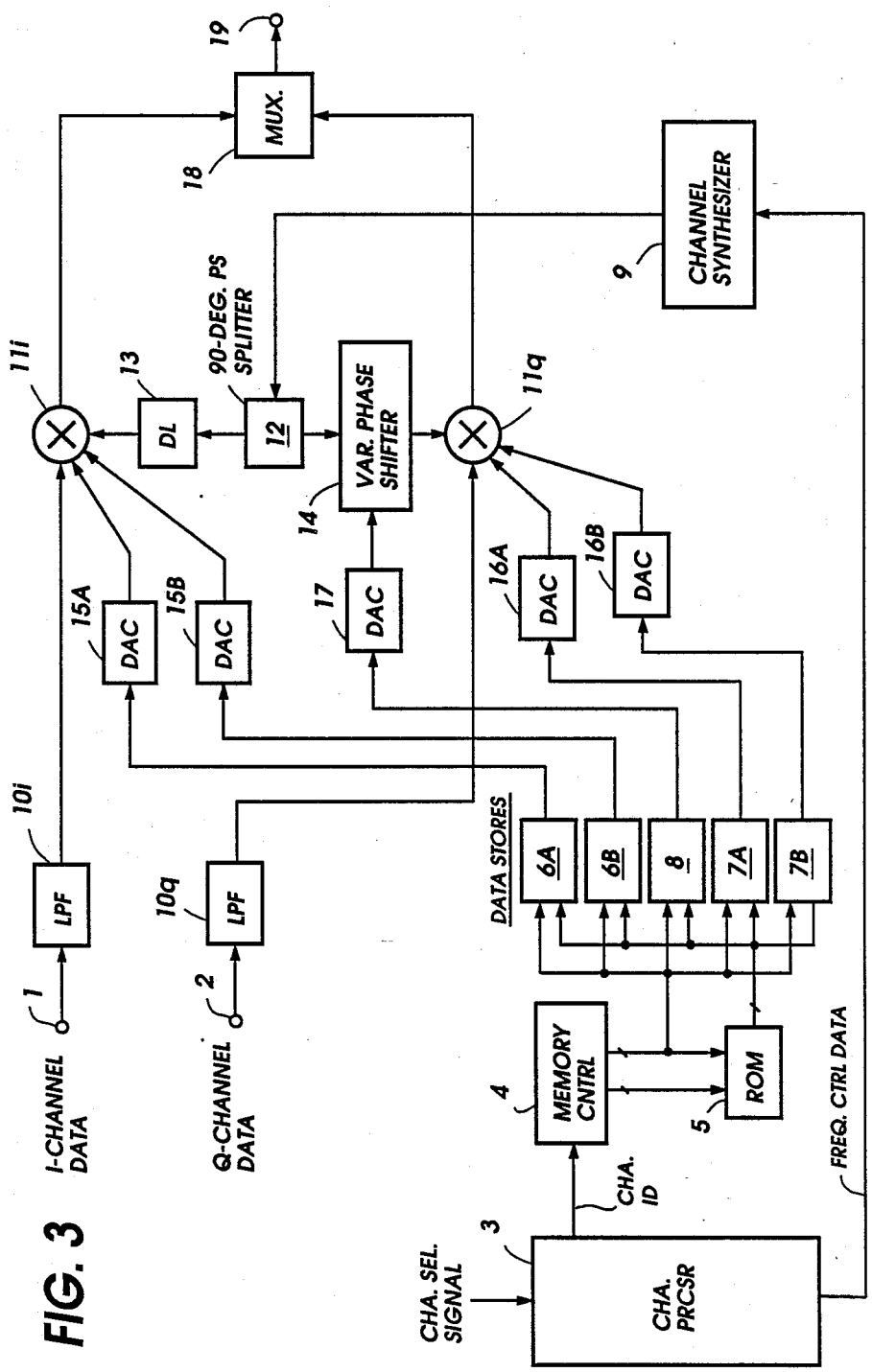
FIG. 3 is a block diagram of a modified embodiment of the present invention.

Another preferred embodiment of the invention is shown in FIG. 3. As illustrated, correction data stores 6A and 6B are provided for storing correction data to be combined with the I-channel data and the carrier input respectively by the mixer 11i and correction data stores 7A and 7B are provided for storing correction data to be respectively combined with the Q-channel data and the 90-degree phase-shifted carrier by the mixer 11q. The digital outputs of data stores 6A and 6B are respectively converted to analog form by D/A converters 15A and 15B and those of data stores 7A and 7B are respectively converted to analog form by D/A converters 16a and 16B. The analog outputs of D/A converters 15A and 15B are supplied to the mixer 11i and those of D/A converters 16a and 16B are supplied to the mixer 11q.

Figure 4:
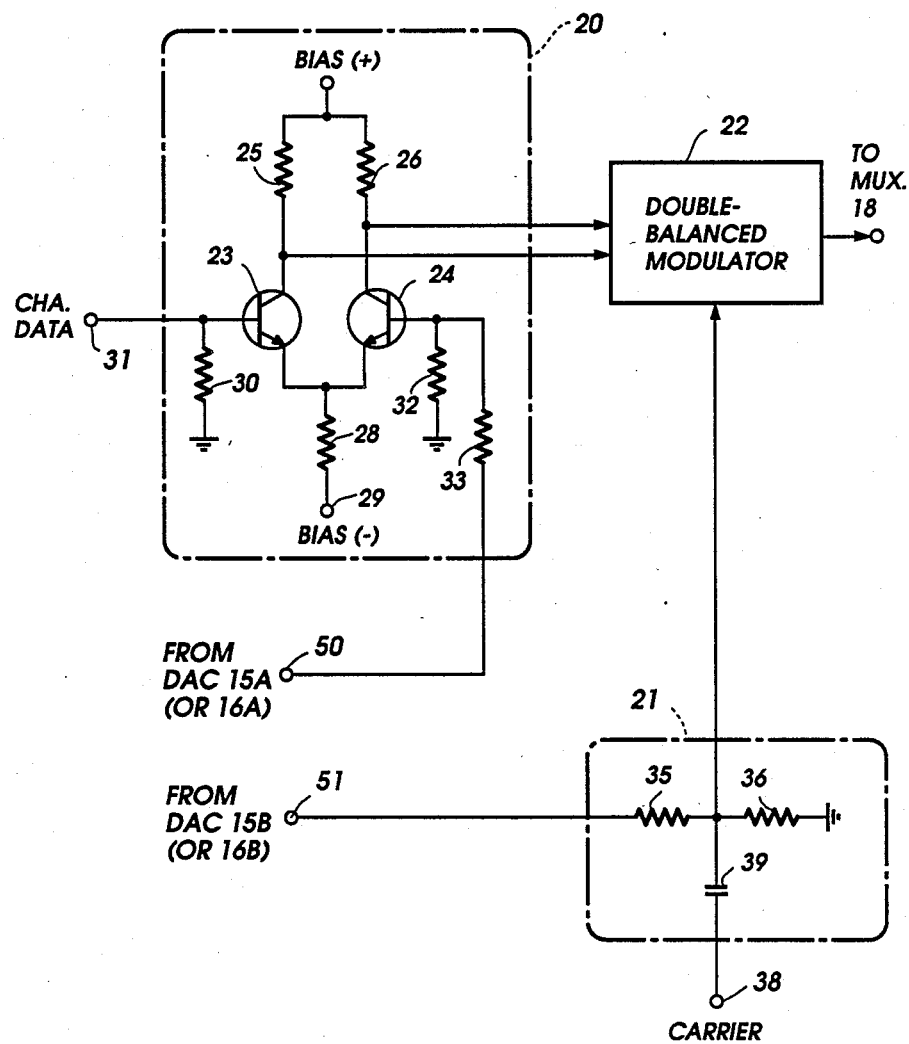
FIG. 4 is a circuit diagram of each of the mixers of FIG. 3.

Each of the mixers 11i and 11q of FIG. 3 is shown in detail in FIG. 4. The error correction voltage from D/A converter 15A or 16A is applied through terminal 50 and resistor 33 to the base of transistor 24 and summed with the associated channel data and the error correction voltage from D/A converter 15B or 16B is connected through terminal 52 and resistor 35 to the carrier input of double-balanced modulator 22 and summed with the associated carrier input.

The foregoing description shows only preferred embodiments of the present invention. Various modifications are apparent to those skilled in the art without departing from the scope of the present invention. For example, the present invention could equally be as well applied to a binary PSK modulation circuit in which error correction is made by a single mixer and the variable phase shifter employed in the quadrature PSK modulation circuit is dispensed with.

What is claimed is:
1. A modulation circuit comprising:
a binary PSK (phase shift keying) balanced modulator having two signal input ports and a carrier input port to which a variable frequency carrier is supplied for modulating said variable frequency carrier with a digital signal of a selected one of a plurality of channels, said modulator having an inherent operating characteristic variable as a function of the frequency of said carrier;
memory means for storing a plurality of digital error correction signals in storage locations corresponding to said plurality of channels, each of said error correction signals being representative of a deviation of said inherent operating characteristic of said modulator when operating at a particular frequency of said carrier from a predetermined operating characteristic;

means for generating said carrier and varying the frequency thereof corresponding to the selected channel;

means for addressing said memory means and reading a digital error correction signal from one of said storage locations corresponding to said selected channel;

a digital-to-analog converter for converting the digital error correction signal read out of said memory means into an analog error correction signal; and differential summing means for differentially summing the digital signal of said selected channel with said analog error correction signal and applying the summed signals to said signal input ports of said PSK balance modulator.

2. A modulation circuit comprising:

a binary PSK (phase shift keying) modulator for modulating a variable frequency carrier with a digital signal of a selected one of a plurality of channels, said modulator having an inherent operating characteristic variable as a function of the frequency of said carrier;

memory means for storing a plurality of first error correction values in first storage locations corresponding to said plurality of channels, each of said first correction values being representative of a first deviation of said inherent operating characteristic of said modulator when operating at a particular frequency of said carrier from a first predetermined operating characteristic and for storing a plurality of second error correction values in second storage locations corresponding to said plurality of channels, each of said second error correction values being representative of a second deviation of said inherent operating characteristic of said modulator when operating at said particular frequency of said carrier from a second predetermined operating characteristic;

means for generating said carrier and varying the frequency thereof corresponding to the selected channel;

means for addressing said memory means and reading a said first error correction value from one of said first storage locations corresponding to said selected channel and reading a said second error correction value from one of said second storage locations corresponding to said selected channel;

first error correcting means for correcting said first deviation in response to said first error correction value read out of said memory means; and second error correcting means for correcting said second deviation in response to said second error correction value read out of said memory means.

3. A modulation circuit as claimed in claim 2, wherein said first and second error correction values are stored in digital form in said memory means, further comprising a first digital-to-analog converter for converting the digital form of said first error correction value read out of said memory means to a first analog signal, a second digital-to-analog converter for converting the digital form of said second error correction value read out of said memory means to a second analog signal, and applying said first and second analog signals to said first and second error correcting means , respectively.

4. A modulation circuit as claimed in claim 3, wherein said first error correcting means comprises means for summing the digital signal of said selected channel with said first analog signal and applying the summed signals to said PSK modulator and said second error correcting means comprises means for summing said second analog signal with said carrier and applying the summed analog signal and said carrier to said PSK modulator.

5. A modulation circuit as claimed in claim 4, wherein said PSK modulator comprises a balanced modulator having two signal input ports to which said summed digital signal and said first analog signal are applied and a carrier input port to which said summed second analog signal and said carrier are supplied.

6. A modulation circuit comprising:

a first binary PSK (phase shift keying) modulator for modulating a first variable frequency carrier with a digital signal of a first selected one of a plurality of channels;

a second binary PSK modulator for modulating a second variable frequency carrier with a digital signal of a second selected one of said plurality of channels, said second variable frequency carrier having the same frequency as said first carrier and being phase shifted with respect thereto by 90 degrees, said PSK modulators having inherent operating characteristics variable respectively as a function of the frequency of said first and second variable frequency carriers;

means for generating said first and second variable frequency carriers and varying the frequencies thereof corresponding to the selected channels;

memory means for storing a plurality of sets of first, second and third error correction values in storage locations corresponding to said plurality of channels, said first and second error correction values being representative of deviations of said inherent operating characteristics of said first and second PSK modulators when operating at a particular frequency of said carriers from predetermined operating characteristics, and said third error correction value being representative of a phase deviation of one of said modulators at said particular frequency from a predetermined phase;

means for addressing said memory means and reading a set of said first, second and third error correction values from one of said storage locations corresponding to said selected channels;

first error correcting means for correcting the operating characteristics of said first PSK modulator in response to said first error correction value read out of said memory means;

second error correcting means for correcting the operating characteristics of said second PSK modulator in response to said second error correction value read out of memory means; and a variable phase shifter for shifting the phase of one of said first and second variable frequency carriers in response to said third error correction value read out of said memory means.

7. A modulation circuit as claimed in claim 6, wherein said first, second and third error correction values are stored in digital form in said memory means, further comprising first, second and third digital-to-analog converters for converting the digital form of said first, second and third error correction values read out of said memory means to first, second third analog signals, respectively, and applying the first and second analog signals to said first and second error correcting means, respectively, and applying the third analog signal to said variable phase shifter.

8. A modulation circuit as claimed in claim 7, wherein said first error correcting means comprises first summing means for summing the digital signal of said first selected channel with said first analog signal and applying the summed signals to said first PSK modulator, and said second error correcting means comprises second summing means for summing the digital signal of said second selected channel with said second analog signal and applying the summed signals to said second PSK modulator.

9. A modulation circuit as claimed in claim 8, wherein said first PSK modulator comprises a first balanced modulator having two signal input ports and a carrier input port to which said first variable frequency carrier is supplied, wherein said first summing means comprises a differential circuit for differentially summing the digital signal of said first selected channel with said first analog signal and supplying the summed signals to said signal input ports of said first balanced modulator, and wherein said second PSK modulator comprises a second balanced modulator having two signal input ports and a carrier input port to which said second variable frequency carrier is supplied, wherein said second summing means comprises a differential circuit for differentially summing the digital signal of said second selected channel with said second analog signal and supplying the summed signals to said signal input ports of said second balanced modulator.

10. A modulation circuit as claimed in claim 8, wherein said first PSK modulator comprises a first balanced modulator having two signal input ports and a carrier input port to which said first variable frequency carrier is supplied, further comprising a first differential circuit for differentially summing the digital signal of said first selected channel with a first constant bias potential and supplying summed outputs to said signal input ports of said first balanced modulator, said summed first-analog signal and said first variable frequency carrier being applied to said carrier input port of said first balanced modulator, and wherein said second PSK modulator comprises a second balanced modulator having two signal input ports and a carrier input port to which said second variable frequency carrier is supplied, further comprising a second differential circuit for differentially summing the digital signal of said second selected channel with a second constant bias potential and supplying summed outputs to said signal input ports of said second balanced modulator, said summed second analog signal and said second variable frequency carrier being applied to said carrier input port of said second balanced modulator.

11. A modulation circuit as claimed in claim 6, further comprising delay means for introducing a constant phase delay to the other of said first and second variable frequency carriers, said constant phase delay corresponding to a center value of said variable phase shift introduced by said variable phase shifter to said one of said first and second variable frequency carriers.

12. A modulation circuit comprising:
a binary PSK (phase shift keying) balanced modulator having two signal input ports and a carrier input port to which a variable frequency carrier is supplied for modulating said variable frequency carrier with a digital signal of a selected one of a plurality of channels, said modulator having an inherent operating characteristic variable as a function of the frequency of said carrier;
memory means for storing a plurality of digital error correction signals in storage locations corresponding to said plurality of channels, each of said error correction signals being representative of a deviation of said inherent operating characteristic of said modulator when operating at a particular frequency of said carrier from a predetermined operating characteristic;
means for generating said carrier and varying the frequency thereof corresponding to the selected channel;
means for addressing said memory means and reading an error correction signal from one of said storage locations corresponding to said selected channel;
a digital-to-analog converter for converting the digital error correction value read out of said memory means into an analog error correction signal; and
first summing means for summing said analog error correction signal with said carrier at said carrier input port of the PSK balanced modulator; and
second summing means for differentially summing the digital signal of said selected channel with a constant bias potential and supplying differentially summed signals to said signal input ports of the PSK balanced modulator.

* * * * *